(12) United States Patent
Asselman et al.

(10) Patent No.: US 12,526,534 B2
(45) Date of Patent: Jan. 13, 2026

(54) METHOD AND IMAGE CAPTURING APPARATUS FOR MINIMISING ERROR IN AMBIENT LIGHT CORRECTED IMAGES

(71) Applicant: KONINKLIJKE PHILIPS N.V., Eindhoven (NL)

(72) Inventors: Michel Jozef Agnes Asselman, Helmond (NL); Mathivanan Damodaran, 'S-Hertogenbosch (NL); Yannyk Parulian Julian Bourquin, Eindhoven (NL); Jonathan Alambra Palero, Waalre (NL); Rieko Verhagen, Vught (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 73 days.

(21) Appl. No.: 18/276,288

(22) PCT Filed: Jan. 26, 2022

(86) PCT No.: PCT/EP2022/051735
§ 371 (c)(1),
(2) Date: Aug. 8, 2023

(87) PCT Pub. No.: WO2022/189060
PCT Pub. Date: Sep. 15, 2022

(65) Prior Publication Data
US 2024/0107178 A1 Mar. 28, 2024

(30) Foreign Application Priority Data
Mar. 11, 2021 (EP) .................... 21161944

(51) Int. Cl.
*H04N 23/76* (2023.01)
*G06T 5/50* (2006.01)
(Continued)

(52) U.S. Cl.
CPC ............ *H04N 23/76* (2023.01); *G06T 5/50* (2013.01); *G06T 7/248* (2017.01); *H04N 23/74* (2023.01);
(Continued)

(58) Field of Classification Search
CPC .......... H04N 23/76; H04N 23/74; G06T 5/50; G06T 7/248; G06T 2207/10152;
(Continued)

(56) References Cited

U.S. PATENT DOCUMENTS

| 11,700,462 B2 | 7/2023 | Palero et al. |
| 2003/0174777 A1* | 9/2003 | Itoh ........................ H04N 5/145 |
| | | 375/E7.262 |

(Continued)

FOREIGN PATENT DOCUMENTS

| JP | 2003304443 A | 10/2003 |
| JP | 2010239267 A | 10/2010 |

OTHER PUBLICATIONS

Kolaman et al., "Light source separation from image sequences of oscillating lights", 2014 IEEE 28th Convention of Electrical and Electronics Engineers in Israel, IEEEI 2014. 1-5.
(Continued)

*Primary Examiner* — Lin Ye
*Assistant Examiner* — Tuan H Le (57) ABSTRACT

According to an aspect, there is provided a method for minimising error in ambient light corrected image due to motion, the method comprising: capturing a plurality of primary images with controlled intensity of illumination varying over time, estimating an error value due to motion for each of a plurality of sub-sets of the plurality of primary images, and performing ambient light correction on an error minimised sub-set of primary images having the lowest estimated error value to generate an ambient light corrected
(Continued)

(ALC) image with a minimised error. Estimating the error value for each sub-set of the plurality of primary images comprises identifying a pair of primary images in the sub-set including a first primary image and a second primary image, wherein the first primary image is captured temporally before the second primary image, determining a displacement vector matrix between the pair of primary images, and estimating the error value for the sub-set of primary images based on the displacement vector matrix between the pair of primary images. Determining the displacement vector matrix includes dividing the first primary image into a plurality of first grid elements and dividing the second primary image into a plurality of second grid elements, matching first grid elements to second grid elements which correspond to the same position on the object, and determining a displacement vector between each matched first grid element and second grid element to determine a displacement vector matrix describing the displacement vector of each grid element.

10 Claims, 6 Drawing Sheets

(51) Int. Cl.
  *G06T 7/246* (2017.01)
  *H04N 23/74* (2023.01)
(52) U.S. Cl.
  CPC .............. *G06T 2207/10152* (2013.01); *G06T 2207/30168* (2013.01); *G06T 2207/30241* (2013.01)

(58) Field of Classification Search
  CPC . G06T 2207/30168; G06T 2207/30241; G06T 5/90; G06T 2207/10016
  See application file for complete search history.

(56) References Cited

U.S. PATENT DOCUMENTS

| | | | |
|---|---|---|---|
| 2004/0080623 | A1 | 4/2004 | Cleveland |
| 2005/0238101 | A1* | 10/2005 | Schu .................... H04N 19/583 375/240.24 |
| 2005/0243175 | A1 | 11/2005 | Yamada et al. |
| 2006/0091288 | A1 | 5/2006 | Keam et al. |
| 2007/0263099 | A1* | 11/2007 | Motta .................... H04N 23/74 348/222.1 |
| 2008/0101786 | A1* | 5/2008 | Pozniansky ............ H04N 23/74 396/164 |
| 2016/0232672 | A1* | 8/2016 | Rezaiifar ............... H04N 23/73 |
| 2017/0280042 | A1 | 9/2017 | Tadano |
| 2019/0166298 | A1 | 5/2019 | Tasdizen et al. |
| 2020/0118521 | A1* | 4/2020 | Facchin .................. G09G 5/02 |
| 2023/0089886 | A1 | 3/2023 | Damodaran et al. |

OTHER PUBLICATIONS

International Search report and Written Opinion of PCT/EP2022/051735, dated Jun. 3, 2022.

* cited by examiner

METHOD AND IMAGE CAPTURING APPARATUS FOR MINIMISING ERROR IN AMBIENT LIGHT CORRECTED IMAGES

CROSS-REFERENCE TO PRIOR APPLICATIONS

This application is the U.S. National Phase application under 35 U.S.C. § 371 of International Application No. PCT/EP2022/051735, filed on Jan. 26, 2022, which claims the benefit of European Patent Application No. 21161944.0, filed on Mar. 11, 2021. These applications are hereby incorporated by reference herein.

FIELD OF THE INVENTION

The present invention relates to a method for minimising error in ambient light corrected (ALC) images, and an image capturing apparatus for the same.

BACKGROUND OF THE INVENTION

Images captured by a camera or image capturing device of an object are often illuminated by ambient light as well as a separate source of illumination. In order to be able to accurately compare images of the same object, or determine colours of an object, the ambient light must be corrected for to produce an ambient light corrected image. However, such images are often generated by comparing pixels of captured images, which introduces errors when there is any movement of the object between frames.

US 2004/080623 discloses systems and methods for minimizing motion clutter in image-generation devices. Temporally-interleaved image-subtraction reduces the magnitude of motion clutter and has no adverse effect on the desired ambient-light cancellation of static images.

SUMMARY OF THE INVENTION

According to a first specific aspect, there is provided a method for minimising error in ambient light corrected image due to motion, the method comprising: capturing a plurality of primary images with controlled intensity of illumination varying over time; estimating an error value due to motion for each of a plurality of sub-sets of the plurality of primary images; and performing ambient light correction on an error minimised sub-set of primary images having the lowest estimated error value to generate an ambient light corrected (ALC) image with a minimised error; wherein estimating the error value for each sub-set of the plurality of primary images comprises: identifying a pair of primary images in the sub-set including a first primary image and a second primary image, wherein the first primary image is captured temporally before the second primary image; determining a displacement vector matrix between the pair of primary images, including: dividing the first primary image into a plurality of first grid elements and dividing the second primary image into a plurality of second grid elements, matching first grid elements to second grid elements which correspond to the same position on the object, and determining a displacement vector between each matched first grid element and second grid element to determine a displacement vector matrix describing the displacement vector of each grid element; and estimating the error value for the sub-set of primary images based on the displacement vector matrix between the pair of primary images.

Estimating the error value for the sub-set of the primary images may comprise selecting the maximum displacement vector in the displacement vector matrix for the pair of primary images, and estimating the error value based on the maximum displacement vector.

Estimating the error value for each sub-set of primary images may comprise identifying a plurality of pairs of primary images in the sub-set; determining the displacement vector matrix for each pair of primary images; and estimating the error value for the sub-set of the plurality of primary images based on the displacement vector matrix for each pair of primary images in the sub-set.

Estimating the error value for the sub-set of the plurality of primary images may comprise selecting the highest absolute displacement vector from the maximum displacement vector for each pair of primary images, and estimating the error value based on the highest absolute displacement vector in the sub-set of primary images.

Determining the displacement vector between temporally adjacent pairs of primary images may comprise matching the first grid elements and the second grid elements. Determining the displacement vector between temporally non-adjacent pairs of primary images may comprise adding displacement vectors of temporally adjacent pairs of primary images to map a motion trajectory between the temporally non-adjacent pair of primary images.

Determining the displacement vector between each matched first grid element and second grid element may comprise performing a displacement estimation based on phase correlation.

Each sub-set of primary images may comprise a plurality of temporally adjacent primary images. Each sub-set of primary images may be offset from another sub-set of primary images by one temporally adjacent primary image.

Estimating the error value due to motion for each of a plurality of sub-sets may be performed in real time on temporally consecutive sub-sets of primary images. Each time the estimated error value for a sub-set of primary images is lower than any previously estimated error values, the method may comprise performing ambient light correction on the respective sub-set of primary images to generate an ALC image with a minimised error.

According to a second aspect, there is provided a non-transitory computer readable storage medium comprising computer-readable instructions that, when executed by a processor, causes the performance of a method in accordance with the first aspect.

According to a third aspect, there is provided a computer program that, when read by a computer, causes performance of a method in accordance with the first aspect.

According to a fourth aspect, there is provided an image capturing apparatus comprising: at least one processor; at least one memory comprising computer-readable instructions; the at least one processor being configured to read the computer readable instructions and cause performance of a method in accordance with the first aspect.

These and other aspects will be apparent from and elucidated with reference to the embodiments described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
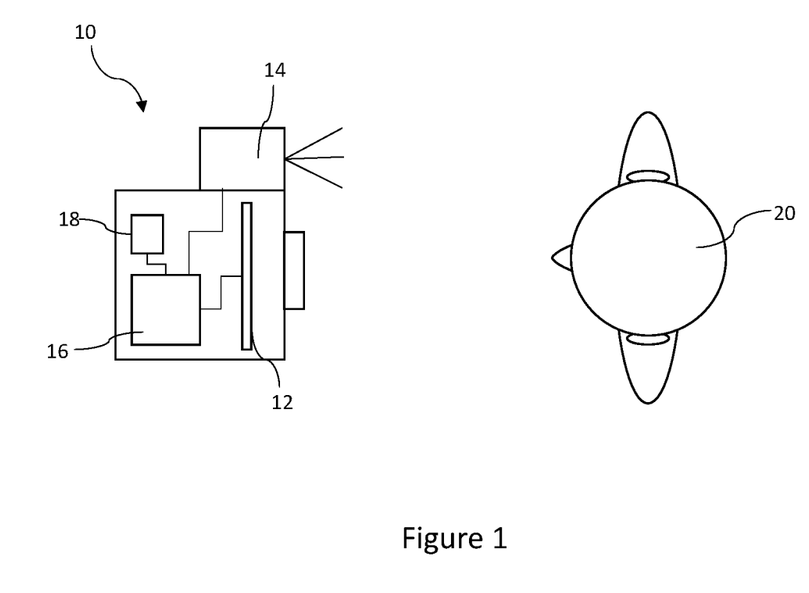
FIG. 1 schematically shows an image capturing apparatus for minimising error in ambient light corrected images.

FIG. 1 shows an image capturing apparatus 10 comprising an image capturing device 12, a light 14, a processor 16 and a memory 18 comprising computer readable instructions. The image capturing device 12 is connected to the processor 16 and is configured to capture images of an object 20, which in this example is a human, which can be read and processed by the processor 16.

The light 14 is configured to illuminate the object 20 and is also connected to the processor 16. The light 14 is configured to emit variable intensity of illumination which is controlled by the processor 16. In other examples, the light 14 may be controller by a separate controller.

The memory 18 comprises computer readable instructions and the processor 16 is configured to read the computer readable instructions to perform a method for minimising error in ambient light corrected (ALC) images.

Figure 2:
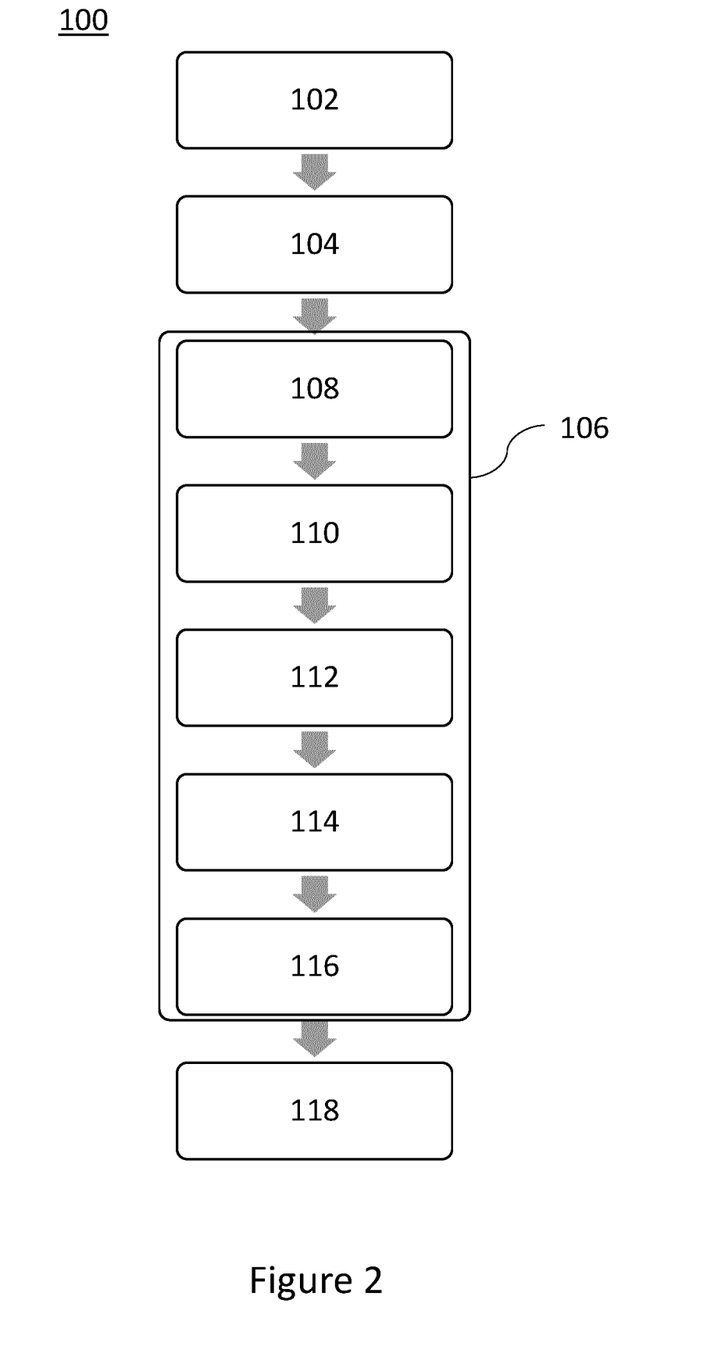
FIG. 2 is a flow chart showing steps of a first example method for minimising error in ambient light corrected images.
Figure 3:
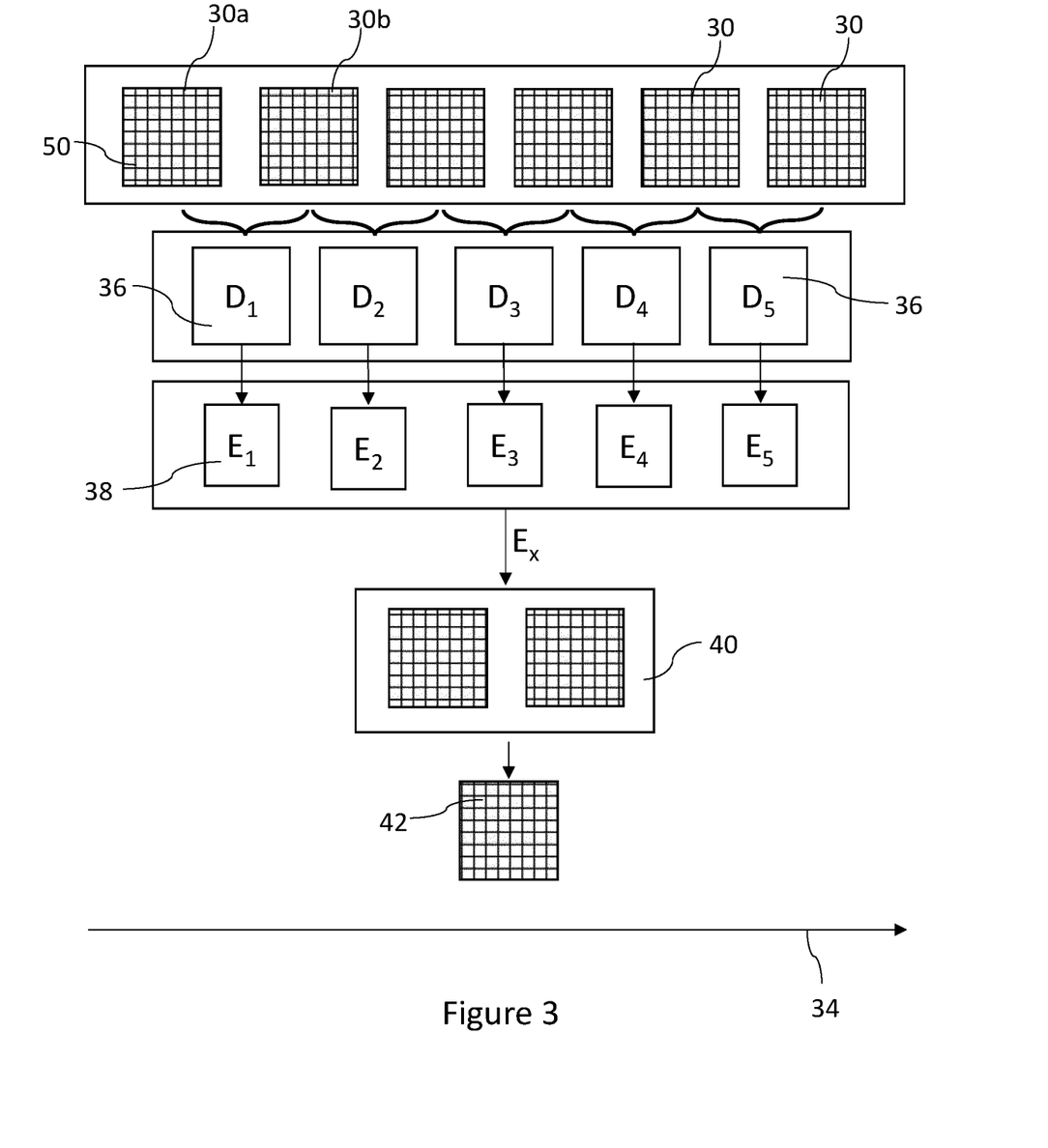
FIG. 3 schematically shows steps of the first example method.

FIG. 2 is a flow chart showing steps of a first example method 100 of minimising error in ALC images. FIG. 3 shows the steps of the method in terms of the outputs of captured and processed images.

In block 102, the first example method 100 comprises capturing a plurality of primary images 30 of the object 20 over time, where the object 20 is illuminated by the light 14, and where the illumination is controlled to vary over time. In FIG. 3, the passage of time is represented by the arrow 34. Each primary image 30 comprises a plurality of pixels 50 which each have a pixel index corresponding to the location of the pixel 50 in the image, and a pixel value defining the intensity of the light captured at that pixel 50.

In block 104, following block 102, the method 100 comprises identifying a plurality of sub-sets of primary images 30. Each sub-set of primary images 30 comprises a predetermined number of temporally adjacent primary images 30 on which ambient light correction will be performed to generate an ambient light corrected (ALC) image 42. In this example, an ALC image is generated from two primary images 30 and so each sub-set of primary images 30 comprises two primary images 30. In other examples, there may be any number of primary images from which a single ALC image may be generated. The process of ambient light correction is explained in more detail below.

Each sub-set of primary images 30 is offset from a preceding sub-set of primary images 30 by one temporally adjacent primary image 30. In other examples, there may be an offset of more than one primary image between sub-sets of primary images.

In block 106, following block 104, the method 100 comprises estimating an error value due to motion of each of a plurality of sub-sets of primary images 30. Block 106 of the method 100 comprises block 108, block 110, block 112, block 114, and block 116. Since the steps in block 106 are applied to each sub-set of primary images 30, the steps will be described below with respect to a single sub-set of primary images 30.

In block 108, the method 100 comprises identifying pairs of primary images 30 within the sub-set of primary images 30. In this example, the sub-set of primary images 30 comprises two primary images 30, and so there is only one pair of primary images 30. Each pair of primary images 30 is defined as a first primary image 30a, and a second primary image 30b, where the first primary image 30a is captured temporally before the second primary image 30b.

It will be appreciated that if the sub-set of primary images comprises more than two primary images, then within the sub-set of primary images, there will be more than one pair of primary images.

In block 110, following block 108, the method 100 comprises dividing the first primary image 30a into a plurality of first grid elements and dividing the second primary image 30b into a plurality of second grid elements. Each grid element may comprise a one pixel 50 or a plurality of pixels 50.

In block 112, the method 100 comprises matching first grid elements which may each represent a position on the object 20, to second grid elements which correspond to the same position on the object 20. Matched first grid elements and second grid elements may comprise pixels 50 with different a pixel index due to movement of the object 20 between capturing the first primary image 30a and the second primary image 30b.

In block 114, the method 100 comprises determining a displacement vector between each matched first grid element and second grid element, describing the movement of the object 20 in terms of the movement from the first primary image 30a to the second primary image 30b, and determining a displacement vector matrix 36 describing the displacement vector of each matched grid element. The displacement vector matrix 36 is a list of vectors which may be recorded in an array corresponding to the grid elements, or may simply be a list of vectors which does not retain correspondence to the grid elements.

In some examples, determining a displacement vector for matched first grid elements and second grid elements may comprise performing a displacement estimation based on phase correlation. Using the phase information of received light at each pixel or grid element to determine a displacement vector, and ignoring the intensity of the light (i.e. the amplitude of the light), means that displacement estimation is more accurate, particularly when there is variation in light.

In block 116, the method 100 comprises estimating the error value 38 for the sub-set of primary images 30 based on the displacement vector matrix 36 between the pair of primary images 30. If there is more than one pair of primary images in the sub-set of primary images, then the error value for the sub-set of primary images is based on the displacement vector matrices of each of the pairs of primary images within the sub-set.

In this example, estimating the error value 38 for the sub-set of primary images 30 comprises selecting the maximum displacement vector in the displacement vector matrix 36 for the pair of primary images 30 and estimating the error value based on the maximum displacement vector. If there are more than one pair of primary images 30 in the sub-set of primary images 30, estimating the error value 38 may comprise selecting the maximum displacement vector in the displacement vector matrices 36 of all of the pairs of primary images 30 within the sub-set of primary images 30, and estimating the error value 38 based on the maximum displacement vectors. In other examples, estimating the error value may comprise aggregating the displacement vectors by summing them, or determining a mean absolute displacement vector, for example.

Since blocks 108-116 are repeated for each sub-set of primary images 30, the output from block 106 is a plurality of error values 38, each corresponding to an estimated error due to motion for a respective sub-set of primary images 30.

In block 118, the method 100 comprises selecting an error minimised sub-set of primary images 40 having the lowest error value Ex, and performing ambient light correction on the error minimised sub-set of primary images 40 to generate an ALC image 42 with a minimised error. In a simplified example of ambient light correction, a first primary image may be captured with the light switched on to illuminate the object, and a second primary image may be captured with the light switched off such that only ambient light illuminates the object. For each pixel of the first primary image, the intensity of the second primary image at that pixel can be subtracted to generate an ALC pixel, and combining all of the ALC pixels generates the ALC image. A more complex example of ambient light correction can be found in Kolaman, Amir & Hagege, Rami & Guterman, Hugo. (2014). Light source separation from image sequences of oscillating lights. 2014 IEEE 28th Convention of Electrical and Electronics Engineers in Israel, IEEEI 2014. 1-5. 10.1109/EEEI.2014.7005874.

Figure 4:
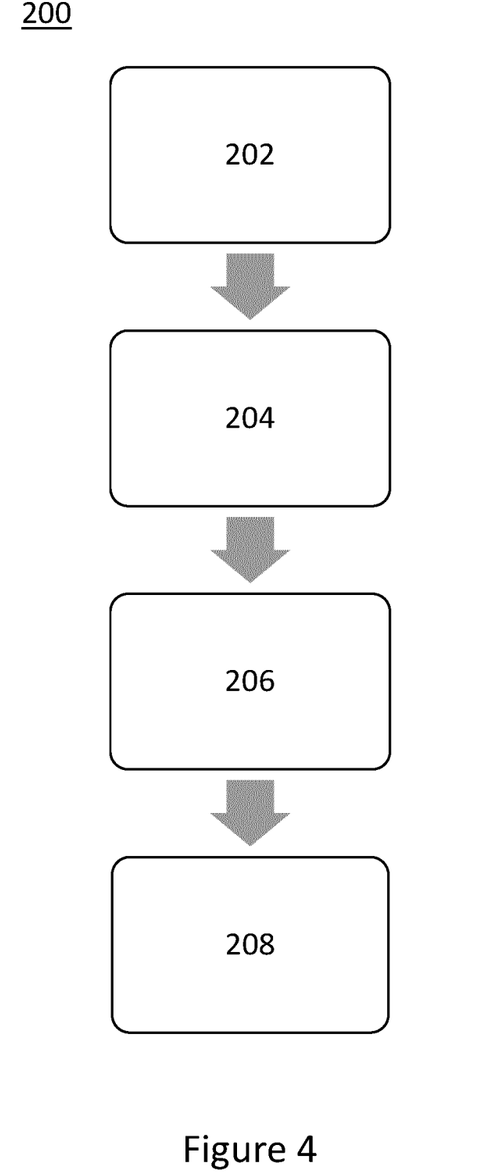
FIG. 4 is a flow chart showing steps of a second example method of estimating an error value for a sub-set of primary images.
Figure 5A:
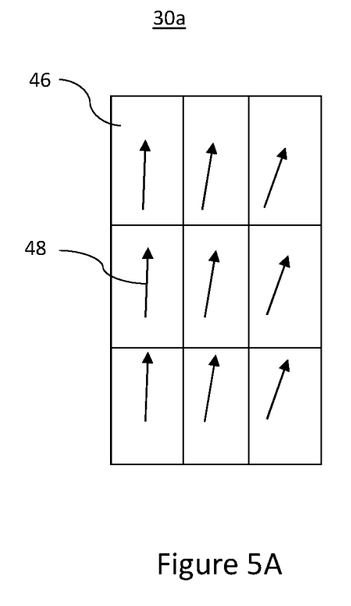
FIGS. 5A-5C schematically show steps of the second example method.
Figure 5B:
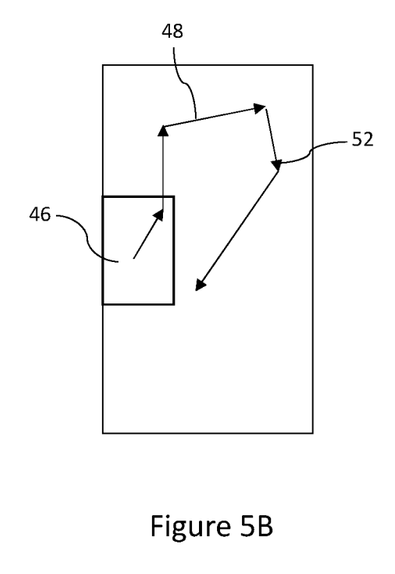
Figure 5C:
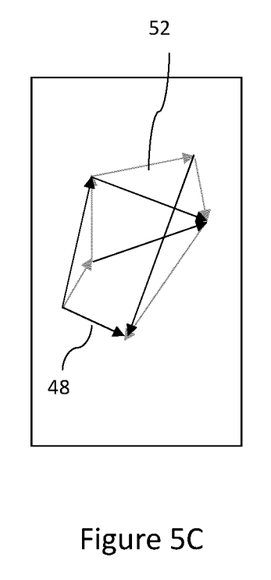

FIG. 4 is a flow chart showing steps of a second example method 200 of estimating the error value 38 for a sub-set of primary images 30 having more than two primary images 30. The second example method 200 may replace block 106 of the first example method 100. FIGS. 5A, 5B and 5C schematically shows steps of the second example method 200.

Referring back to FIG. 3, the second example method 200 produces the same basic outputs at various steps as the first example method 100, and therefore the description below will refer to reference numerals in FIG. 3.

In block 202, the second example method 200 comprises identifying a plurality of pairs of primary images 30 in the sub-set. For example, if a sub-set contains three primary images, the sub-set will comprise three independent pairs of primary images including (i) a first primary image and a second primary image, (ii) the second primary image and a third primary image, and (iii) the first primary image and the third primary image. In the example shown in FIGS. 5A-5C, the sub-set comprises six primary images 30 which comprises 15 pairs of primary images 30.

In block 204, the method 200 comprises determining a displacement vector matrix 36 for each pair of temporally adjacent primary images 30 in a similar manner to blocks 110-114 of the first example method 100. FIG. 5A shows a first primary image 30a divided into a plurality of grid elements 46, and a displacement vector 48 is illustrated by an arrow for each grid element 46, where the beginning of the arrow is the location of the grid element on the first primary image 30a of the pair and the end of the arrow is the location of the matching grid element on the second primary image 30b of the pair. The plurality of displacement vectors 48 for the plurality of grid elements 46 forms the displacement vector matrix 36 between the first primary image 30a and the second primary image 30b of a pair of temporally adjacent primary images 30.

In block 206, the method 200 comprises determining a displacement vector matrix 36 for temporally non-adjacent pairs of primary images 30 by adding displacement vectors 48 for each grid element 46 of temporally adjacent pairs of primary images 30, to map a motion trajectory 52 between the pair of temporally non-adjacent primary images 30.

FIG. 5B shows the motion trajectory 52 for a grid element 46 between a first primary image and a sixth primary image by aggregating the displacement vectors 48 between temporally adjacent pairs of primary images 30. In other examples, the displacement vector matrix for temporally non-adjacent primary images may be calculated in a similar manner as the displacement vector matrix for temporally adjacent primary images. Determining the displacement vector matrix for temporally non-adjacent pairs of images by mapping a motion trajectory requires less processing power than matching grid elements and calculating the displacement vectors for matched grid elements between the temporally non-adjacent pair of primary images.

FIG. 5C shows displacement vectors 48 between temporally non-adjacent pairs of primary images superimposed on the motion trajectory 52.

In block 208, the method 200 comprises estimating the error value 38 for the sub-set of primary images 30 based on the displacement vector matrix 36 between each of the pairs of primary images 30 within the sub-set. In this example, estimating the error value for the sub-set of the plurality of primary images 30 comprises determining a maximum displacement vector for each pair of primary images 30 within the sub-set of primary images 30, and selecting the highest absolute displacement vector from the maximum displacement vectors. The error value 38 may be based on the highest absolute displacement vector.

This method 200 can be repeated for every sub-set of primary images 30 to estimate an error value, and the method can continue to block 118 of the first example method 100 to select an error minimised sub-set of primary images 40 having the lowest error value Ex, and perform ambient light correction on the error minimised sub-set of primary images 40 to generate an ALC image 42 with a minimised error.

Figure 6:
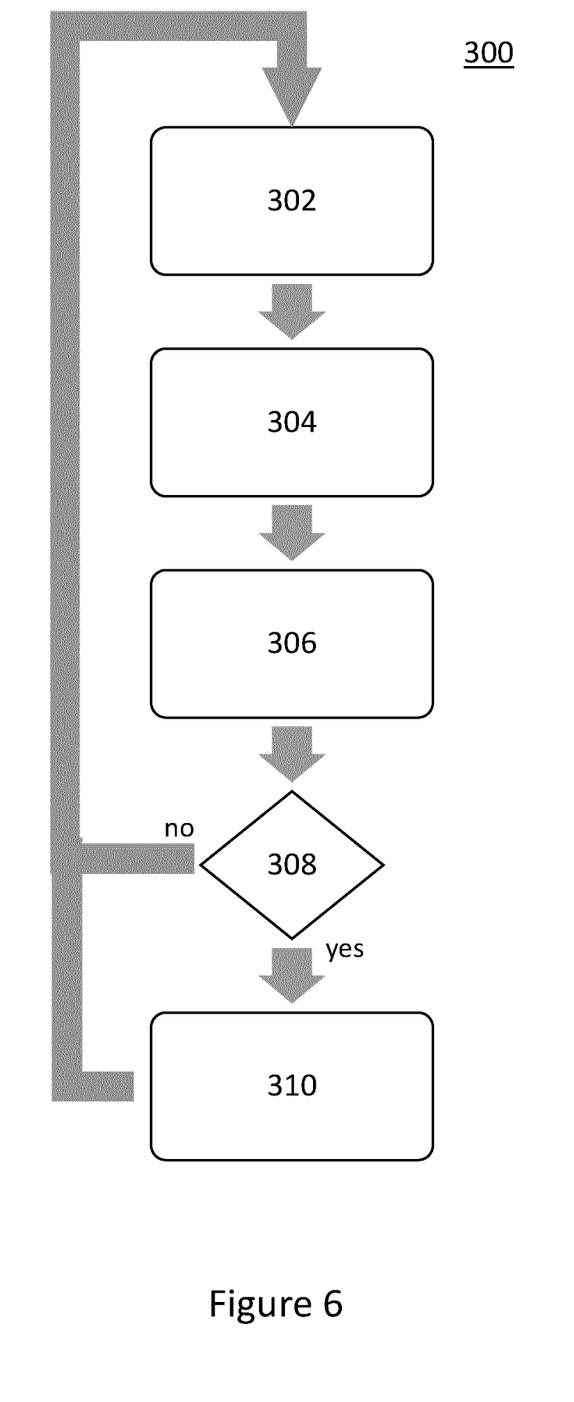
FIG. 6 is a flow chart showing steps of a third example method for minimising error in ambient light corrected images.

FIG. 6 shows a third example method 300 for minimising error in ALC images due to motion.

In block 302, the method 300 comprises capturing a plurality of primary images 30 in a similar manner to block 102 of the first example method 100.

In block 304, the method comprises identifying a sub-set of primary images 30 comprising a predetermined number of temporally adjacent primary images 30 on which ambient light correction could be performed to generate an ambient light corrected (ALC) image 42, in a similar manner to block 104 of the first example method 100.

In block 306, following block 304, the method 300 comprises estimating an error value 38 due to motion of the sub-set of primary images 30. This may be in a manner similar to blocks 202-208 of the second example method 200, or block 106 of the first example method 100.

In block 308, it is determined whether the error value 38 of the sub-set of primary images 30 is the lowest error value found so far. If it is determined that the error value 38 of the sub-set of primary images 30 is not the lowest so far, then the method 300 returns to block 302 to capture at least one further primary image 30 and to identify another later sub-set of primary images 30. The later sub-set of primary images 30 may be offset from the earlier sub-set of primary images 30 by one temporally adjacent primary image 30.

Each sub-set of primary images 30 is offset from a preceding sub-set of primary images 30 by one temporally adjacent primary image 30. In other examples, there may be an offset of more than one primary image between sub-sets of primary images.

If it is determined in block 308 that the error value of the sub-set of primary images 30 is the lowest so far (i.e. the sub-set of primary images 30 is an error minimised sub-set of primary images 40), the method 300 continues to block 310 in which ambient light correction is performed on the error-minimised sub-set of primary images 40 to form an ALC image 42 having a minimised error.

The method 300 then returns to block 302 to continue capturing further primary images 30. Therefore, the third example method 300 is very similar to the first example method 100, and differs in that it estimates the error value of sub-sets of primary images 30 in real time on temporally consecutive sub-sets of primary images, and performs ambient light correction on a sub-set of primary images 30 each time the respective sub-set has an estimated error value 38 lower than previously estimated error values, rather than determining which of a plurality of sub-sets of primary images 30 has the lowest estimated error after the plurality of primary images 30 has been captured, and performing ambient light correction on the error minimised sub-set.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for minimising error in ambient light corrected image due to motion, the method comprising:
   capturing a plurality of primary images with controlled intensity of illumination varying over time;
   estimating an error value due to motion for each of a plurality of sub-sets of the plurality of primary images; and
   performing ambient light correction on an error minimised sub-set of primary images having the lowest estimated error value to generate an ambient light corrected image with a minimised error;
   wherein estimating the error value for each sub-set of the plurality of primary images comprises:
      identifying a pair of primary images in the sub-set including a first primary image) and a second primary image, wherein the first primary image is captured temporally before the second primary image;
      determining a displacement vector matrix between the pair of primary images, including:
         dividing the first primary image into a plurality of first grid elements and dividing the second primary image into a plurality of second grid elements,
         matching first grid elements to second grid elements which correspond to the same position on the object, and determining a displacement vector between each matched first grid element and second grid element to determine a displacement vector matrix describing the displacement vector of each grid element; and
      estimating the error value for the sub-set of primary images based on the displacement vector matrix between the pair of primary images.

2. A method according to claim 1, wherein estimating the error value for the sub-set of the primary images comprises selecting the maximum displacement vector in the displacement vector matrix for the pair of primary images, and estimating the error value based on the maximum displacement vector.

3. A method according to claim 1, wherein estimating the error value for each sub-set of primary images comprises:
   identifying a plurality of pairs of primary images in the sub-set;
   determining the displacement vector matrix for each pair of primary images; and
   estimating the error value for the sub-set of the plurality of primary images based on the displacement vector matrix for each pair of primary images in the sub-set.

4. A method according to claim 2, wherein estimating the error value for the sub-set of the plurality of primary images comprises selecting the highest absolute displacement vector from the maximum displacement vector for each pair of primary images, and estimating the error value based on the highest absolute displacement vector in the sub-set of primary images.

5. A method according to claim 4, wherein determining the displacement vector between temporally adjacent pairs of primary images comprises matching the first grid elements and the second grid elements, and wherein determining the displacement vector between temporally non-adjacent pairs of primary images comprises adding displacement vectors of temporally adjacent pairs of primary images to map a motion trajectory between the temporally non-adjacent pair of primary images.

6. A method according to claim 1, wherein determining the displacement vector between each matched first grid element and second grid element comprises performing a displacement estimation based on phase correlation.

7. A method according to claim 1, wherein each sub-set of primary images comprises a plurality of temporally adjacent primary images, and wherein each sub-set of primary images is offset from another sub-set of primary images by one temporally adjacent primary image.

8. A method according to claim 7, wherein estimating the error value due to motion for each of a plurality of sub-sets is performed in real time on temporally consecutive sub-sets of primary images, and each time the estimated error value for a sub-set of primary images is lower than any previously estimated error values, the method comprises performing ambient light correction on the respective sub-set of primary images to generate an ALC image with a minimised error.

9. A non-transitory computer readable storage medium comprising computer-readable instructions that, when executed by a processor, causes the performance of a method in accordance with claim 1.

10. An image capturing apparatus comprising:
   at least one processor;
   at least one memory comprising computer-readable instructions;

the at least one processor being configured to read the computer readable instructions and cause performance of a method in accordance with claim 1.

* * * * *